INVENTORS
RAYMOND L. COLE
BY CLAIR O. COLE
Dugger, Braddock,
Johnson & Westman
ATTORNEYS

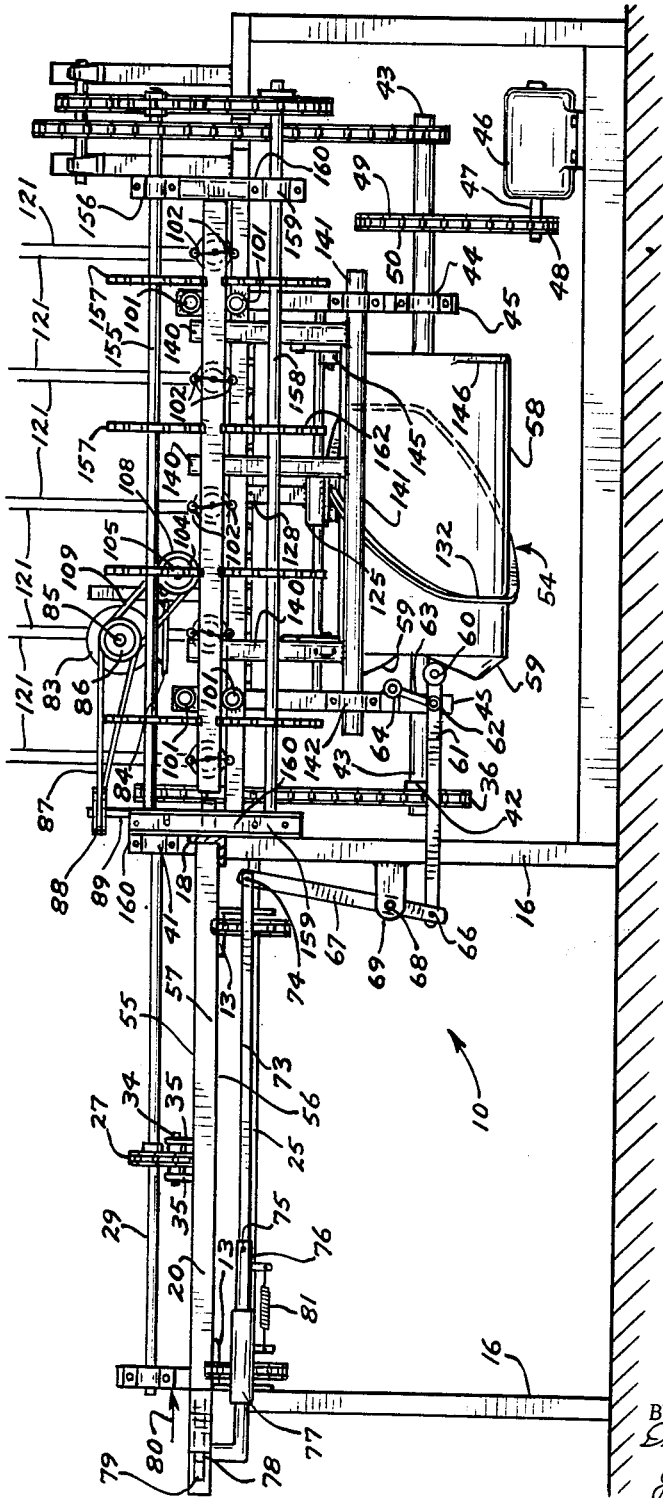

Nov. 3, 1964         R. L. COLE ETAL                3,155,124
              APPARATUS FOR MAKING POULTRY FLOORS
Filed Aug. 22, 1962                              4 Sheets-Sheet 3
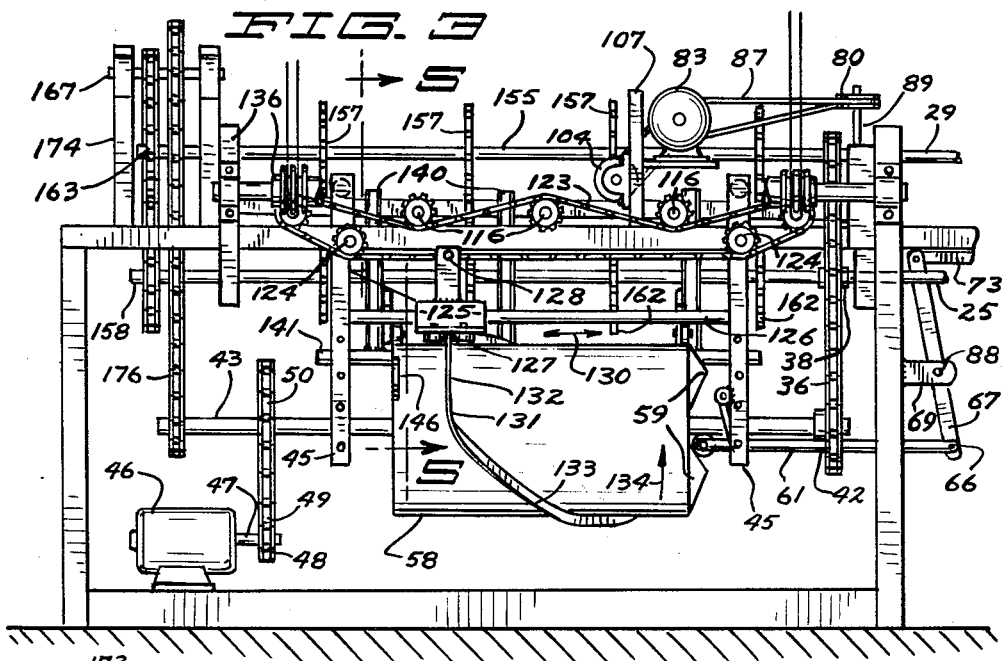
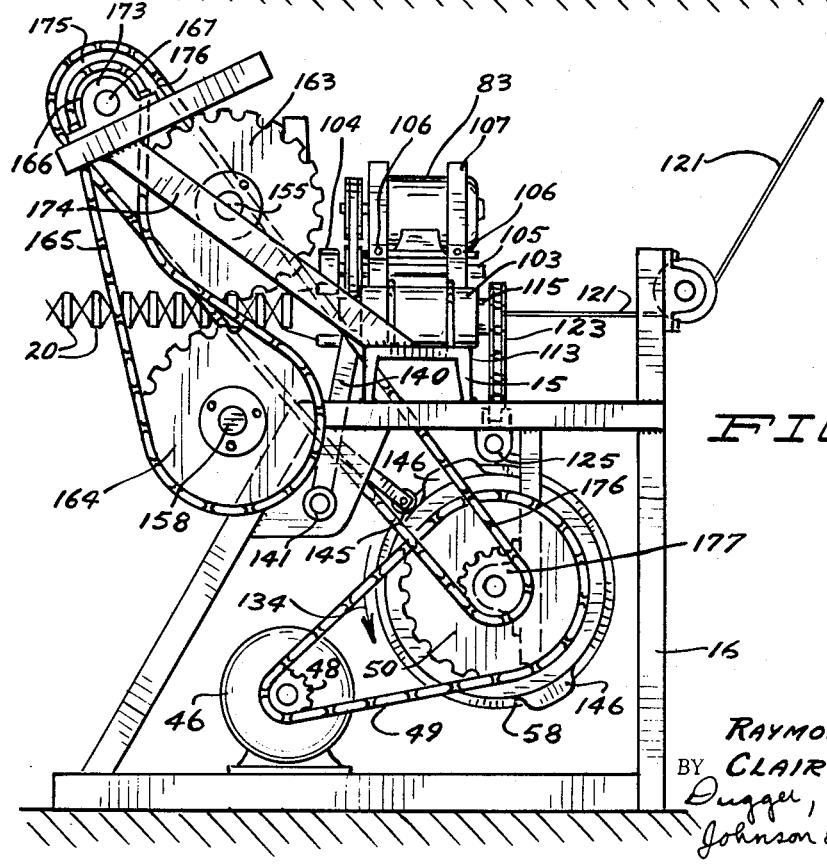
INVENTORS
RAYMOND L. COLE
BY CLAIR O. COLE
Dugger, Braddock,
Johnson & Westman
ATTORNEYS

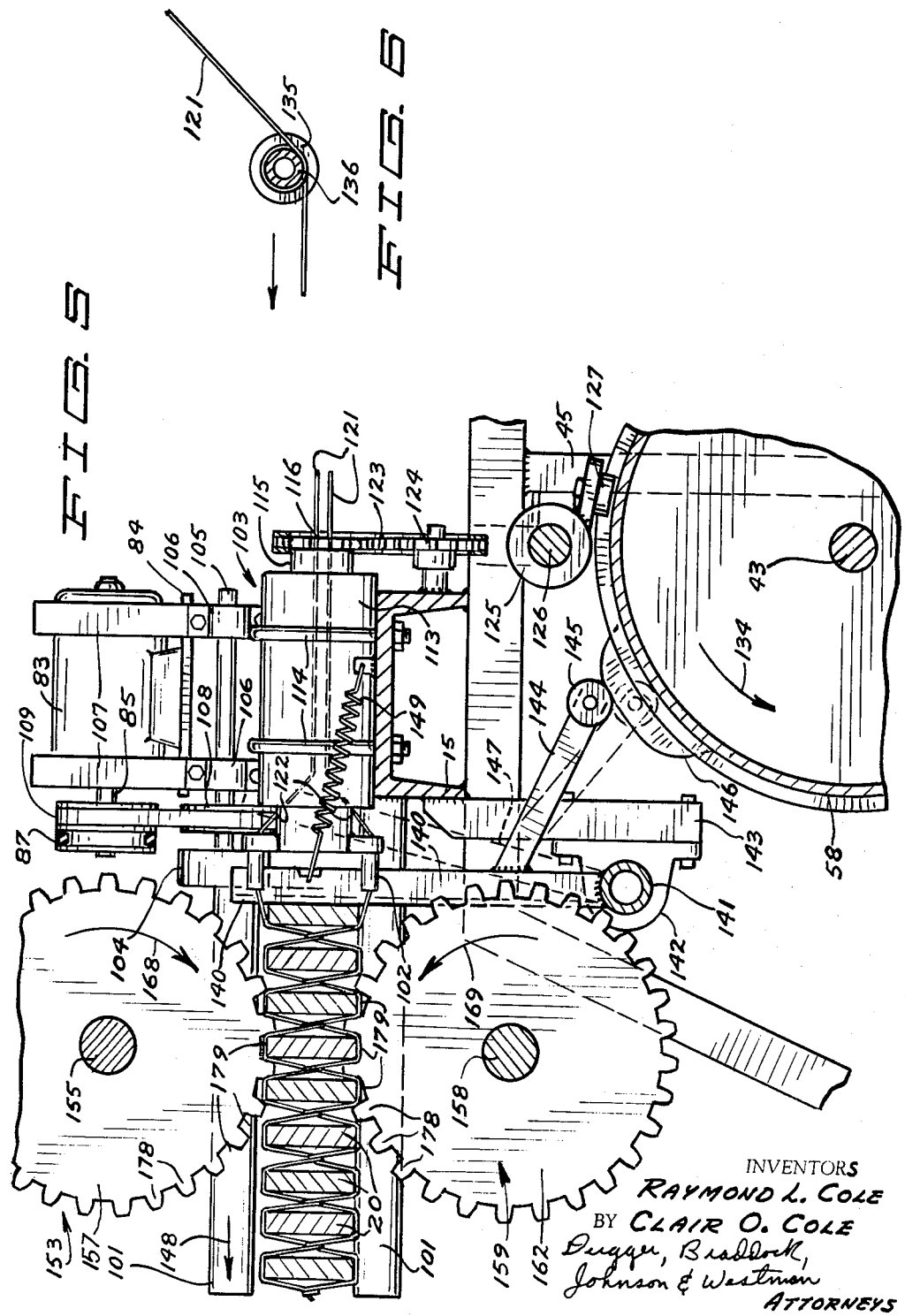

United States Patent Office 3,155,124
Patented Nov. 3, 1964

3,155,124
APPARATUS FOR MAKING POULTRY FLOORS
Raymond L. Cole and Clair O. Cole, both of
7 River Road, Grand Rapids, Minn.
Filed Aug. 22, 1962, Ser. No. 218,715
10 Claims. (Cl. 140—25)

The present invention has relation to apparatus for making poultry floors and more particularly to a machine that will automatically make a floor comprised of a plurality of spaced parallel slats placed on edge and woven together with wires.

Presently in large poultry raising or feeding operations it is necessary to have slatted floors in order to keep the surface on which the poultry walks clean. The floor also has to be capable of supporting substantial weight in that human beings walk on the floors and also at times wheelbarrows full of feed will be transported across the floors as well as other heavy vehicles.

At the present time slatted poultry floors are made in sections generally made in one of two ways. One type of floor section utilizes slats placed on edge in parallel, spaced relationship with a wooden dowel extending between the slats and through holes drilled through the sides of the slats. The slats are nailed to the dowels and thus held in spaced relationship. A second type of floor section has slats arranged in the same manner as in the first type but utilizes a steel rod extending through the slats with spacers between adjacent slats to hold them spaced.

Both of these types of poultry floors are extremely time consuming to make and expensive. In addition the slats are greatly weakened because holes are drilled through them with consequent splitting and breaking of the slats when the floor is subjected to heavy loads.

The device of the present invention, on the other hand, produces a poultry floor automatically without drilling the slats or using dowels for holding them together. The floor sections are made in a continuous operation. Wooden slats are fed into a machine that has a plurality of wire twisting heads thereon. The wire twisting heads each guide two wires that are spaced apart and held substantially parallel. A slat is positioned between each pair of wires with the wires adjacent the edge sufraces of the slats. Each of the pairs of wires are then twisted together once so that they are clamped tightly down onto the slats. The wires and slat are being advanced continuously through the machine during this operation. A second slat is then placed between the pairs of wires, the pairs of wires are again twisted together and this process is repeated until a floor section of a desired length is obtained. Mechanism is provided for maintaining the wires under tension.

It is well known to utilize machines that twist pairs of wires in between adjacent slats for making snow fence. However, snow fencing utilizes slats laid on edge and is made too weak for supporting poultry and/or people and vehicles. In addition the broad side surfaces of the slats cannot be used for the floor surface in poultry house as foreign material will build up on these relatively large surfaces and cause unsanitary conditions. Snow fence making machines cannot use slats placed on edge. Until the device of the present invention was advanced, no one had solved the problem connected with making a rigid strong poultry floor section from slats utilizing twisted wire for joining the slats together.

It is an object of the present invention to present a machine form aking slat-type poultry floor sections.

In the drawings,

FIG. 2 is a front elevational view of the device of FIG. 1, taken as on line 2—2 in FIG. 1 with parts in section and parts broekn away;

FIG. 3 is a fragmentary rear elevational view of the device of FIG. 2 with parts in section and parts broken away;

FIG. 4 is a fragmentary side elevational view of the device of FIG. 3 as viewed from a left side thereof;

FIG. 5 is a fragmentary enlarged sectional view taken as on line 5—5 in FIG. 3; and FIG. 6 is an enlarged vertical sectional view of a wire guide and tensioning device used on the present invention.

Figure 1:
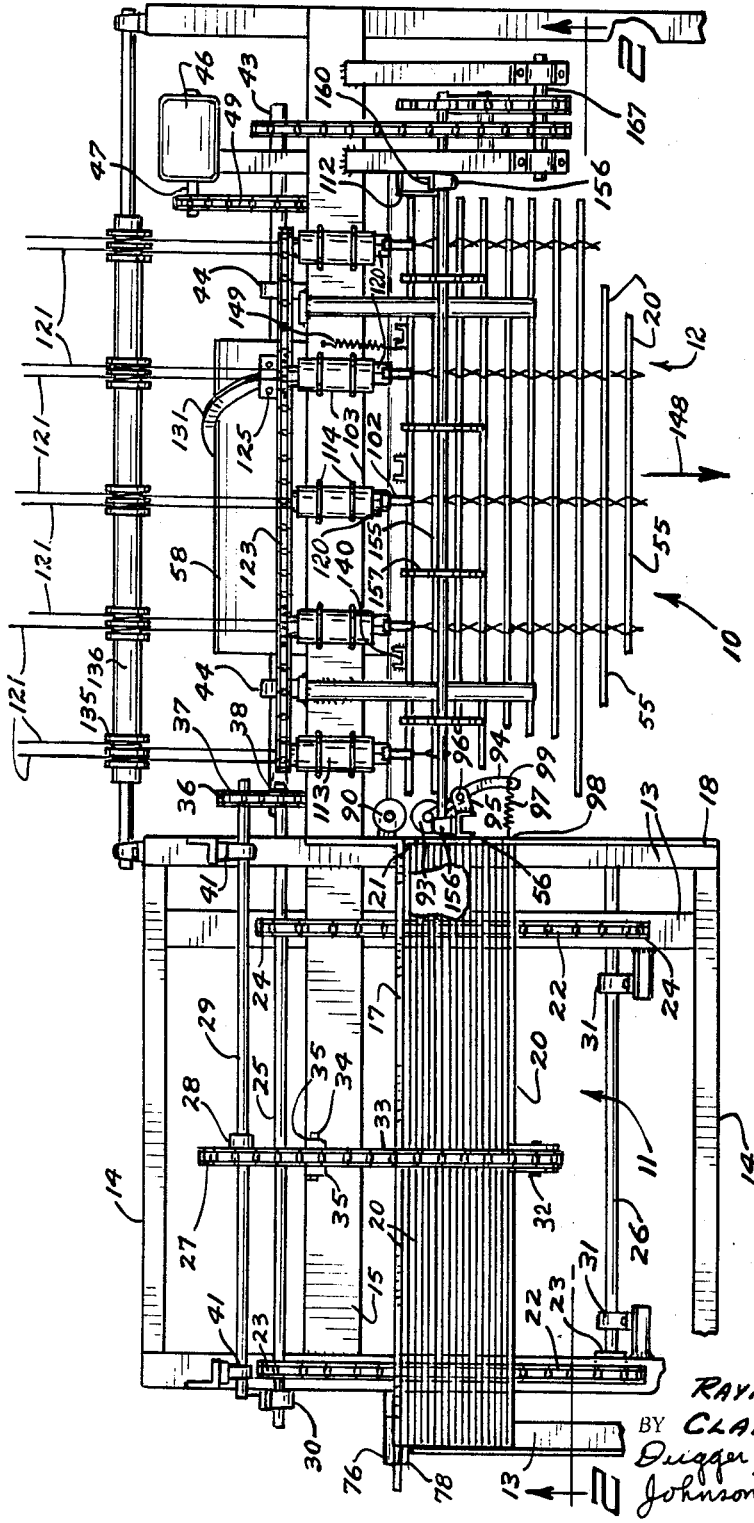
FIG. 1 is a top plan view of a poultry floor making machine made according to the present invention with parts removed for sake of clarity.

Referring to the drawings and the numerals of reference thereon, a fence weaving machine illustrated generally at 10 includes a slat supply loading table or section 11 and a floor weaving section 12. The slat loading table includes a pair of spaced substantially parallel support rails 13 joined together with front and rear cross members 14, 14 and mounted to a main support channel 15. In addition, a plurality of legs 16 are provided to support the machine. A right hand guide member 18 is provided for positioning the slats properly on the loading section. A stop member 17 extends between the support rails and is positioned so that when a slat 20 is contiguous with it, the slat is aligned with an opening 21 on guide member 18 adjacent the floor weaving section. A pair of lower drag chains 22, 22 are each mounted on a separate pair of front and rear spaced sprockets 23 and 24, respectively, which in turn are mounted on a pair of spaced parallel front and rear shafts 25 and 26. The lower drag chains extend above support rails 13 through provided slots. The shafts 25 and 26 are supported by bearings 30, 30 and 31, 31 respectively. In addition a top drag chain 27 is mounted over a drive sprocket 28 that is mounted onto a drive shaft 29. The top drag chain 27 extends over an idler sprocket 32 that in turn is mounted at an end of an idler arm 33 which is pivoted as at 34 to a pair of ears 35, 35 that are integral with the main support channel 15. The drive shaft 25 for the lower drag chains and the drive shaft 29 for the upper drag chain are driven from a common chain 36 mounted on sprockets 37 and 38 which are mounted on shafts 29 and 25, respectively. The shafts are mounted in suitable bearings, for example bearings 41, 41 for shaft 29. The chain 36 is also mounted on a drive sprocket 42 which is drivably mounted on a main machine drive shaft 43. The main drive shaft 43 is rotatably mounted in bearings 44 which in turn are mounted on support legs 45 that depend from main support channel 15. The main drive shaft 43 is driven with an electric motor 46 which has an output shaft 47 on which a drive sprocket 48 is drivably mounted. Drive sprocket 48 drives a chain 49 which in turn drives a main shaft drive sprocket 50 on the drive shaft 43.

The slats 20 have a pair of spaced parallel narrow edge surfaces 55 and 56 and a pair of wider side surfaces 57 joining the edge surfaces. The slats are placed on the loading section on edge or, in other words with each of the side surfaces 57 contiguous with a side surface of another slat and with the edge surfaces 55 and 56, respectively, facing upwardly and downwardly.

A central control programing device 54 includes shaft 43 and a programing drum 58 which is drivably mounted on the main drive shaft 43 and is used as a timing device for the various functions of the floor weaving section. As viewed from FIG. 2, at the left hand edge of the drum are a pair of cam ears 59, 59 which are integral with the edge of the drum and are disposed 180 degrees apart on the drum. The cam ears 59 are positioned to engage a cam follower roller 60 which in turn is rotatably mounted on a first cross link 61. The first cross link 61 is pivotally mounted as at 62 to a connecting rod 63 which in turn is pivotally mounted as at 64 to one of the supports 45, which are part of the main frame.

The link 61 is pivotally mounted as at 66 to a lever 67 which in turn is pivotally mounted as at 68 to an ear 69 integral with one of the legs 16 of the machine. The lever 67 in turn has a second cross link 73 pivotally mounted thereto as at 74. The second cross link 73 extends transversely with respect to the slat loading table of the fence weaving machine and in turn is pinned as at 75 to a slider 76 that is slidably mounted in a guide tube 77 which in turn is fixedly attached with respect to the slat loading table frame. The slider 76 has a finger or trigger 78 which extend through a provided slot 79 in a top member 17 and is positioned to engage the end of a slat 20 that is against the top member 17. The slot 21 is provided in guide member 18 of the slat loading table so that the finger 78 can move along its provided slot 79 and contact the end slat 20 and move it inwardly in direction as indicated by arrow 80 in FIG. 2. The slat is then moved to position wherein it will be fed into the fence weaving section. When the roller 60 is no longer contacted by cam ear 59 a spring 81 is provided to return slider 76 and consequently finger 78 to its initial position so another slat can move against stop 17.

The mechanism for feeding the slat into the floor weaving section of the machine is perhaps best seen in FIGS. 1 and 2. Referring to FIG. 2, an electric motor 83 is mounted on a support 84 which is positioned above the main support channel 15. Electric motor 83 has an output shaft 85 and a double V-belt drive sheave 86 mounted thereon. A first V-belt 87 is drivably mounted over one portion of the sheave 86 and extends to a driven sheave 88 wihch is in a horizontal plane, or in other words positioned 90 degrees from the plane of the sheave 86 on the motor. The belt 87 is twisted between the motor sheave 86 and sheave 88. The sheave 88 is drivably mounted on a vertical shaft 89, which, in turn, is rotatably mounted with respect to the frame and has a slat drive roller 90 drivably mounted at the lower portion thereof. The slat drive roller 90 can be seen in FIG. 1, as in FIG. 1 the motor and sheaves have been removed for sake of clarity.

The slat drive roller 90 is a friction roller, preferably rubber covered or with another suitable friction material on the periphery thereof and is positioned so that the peripheral surface of the sheave is aligned with and slightly interferes with the projection of slot 21 in the guide member 18 of the feed table.

A spring mounted idler roller 93 is rotatably mounted on a lever arm 94 which in turn is pivoted to a bracket 95, as at 96. The bracket 95 is fixedly attached to a frame member. A spring 97 is fastened to the guide member 18 as at 98 and the opposite end of the spring is attached as at 99 to a portion of the lever 94 extending beyond pivot point 96. The spring 97 resiliently urges the idler roller 93 toward the drive roller 90. The slat is moved by finger or trigger 78 of slider 76 through slot 21 so that one side surface of the slat comes into engagement with the drive roller 90. The idler roller yields so that the slat goes between the idler and drive rollers. The drive roller will pull the slat through the opening 21 and will position it in the fence weaving section of the machine. The idler roller 93 resiliently urges the slat and the drive roller 90 together to provide friction for driving the slat.

The slat 20 is fed between two pairs of vertically aligned and spaced support guide pipes 101, 101 which are provided to hold and guide the slat to position between guide bushings 102, 102 on each of a plurality of winding heads, illustrated generally at 103.

The slat is also further driven by a second slat drive roller 104 (see FIGS. 2, 3 and 5) which is rotatably mounted on a shaft 105 which in turn is mounted in suitable bearings 106, 106 on upright supports 107, 107, which are fixedly attached to the main cross channel 15. Second slat drive roller 104 is driven with a sheave 108 that is drivably mounted on shaft 105 and in turn is driven from one section of the drive sheave 86 on motor 83 through a V-belt 109. The second slat drive roller 104 contacts the top edge surface of the slat and serves to hold the slat in position and drive it further inwardly against a stop member 112 so that the slat is properly positioned between the wire guide bushings 102 on each of the winding heads 103.

As perhaps best seen in FIG. 5 each of the winding heads 103 (there are five in the form of the invention shown) is comprised of an outer tubular housing 113 that is mounted to main cross channel 15 with a pair of U-bolts 114, 114. A separate tubular wire twisting member 115 is rotatably mounted within each of the outer housings 113. A sprocket 116 is drivably attached to each of the tubular twisting members 115 at the rear end thereof. The sprockets have an open center portion aligned with the center portion of its tube so the twisting member assembly is tubular.

The tubular twisting members 115 each have a forwardly projecting portion 120 that extends outside and forwardly from its outer housing 113. The wire guide bushings 102, 102 are fixedly attached to the outer periphery of the forward portion 120 of tubular twisting members 115 and are positioned 180 degrees apart. Each of the tubular twisting members 115 has a separate pair of wires 121, 121 passing through the open center thereof and threaded through provided openings at 122, 122 on the forwardly projecting portions 120 of the twisting members and then each of the wires is threaded through one of the tubular guide bushings 102.

The twisting members 115 are driven with the sprockets 116 by a chain 123 that is mounted over each of the sprockets 116 in order. The chain is threaded so that all of the sprockets turn in the same direction. For example, referring to FIG. 3, it will be seen that the chain goes around the end sprockets 116, underneath the intermediate sprockets 116, and over the middle sprocket 116. In addition chain 123 is mounted on idler sprockets 124, 124. A cross head 125 is fixed to the chain 123, as at 128, through a suitable attachment link. The cross head is slidably mounted on cross head guide rod 126 which is fixedly attached to legs 16. The cross head has a track follower portion 127 which fits over a track 131 on drum 58.

The cross head is movable transversely to the machine in directions as indicated by double arrow 130 in FIG. 3. The cross head is driven by the main control drum 58 through the use of a slider track 131 that is fixedly attached to the periphery of the main control drum 58. The track is a closed loop, double acting track in that it has two identical segments, each operative for 180 degrees of drum rotation. The segments each include a straight portion 132 and a curved actuating portion 133 for each 180 degrees of the drum periphery. During operation the drum 58 is rotating continuously and while the track follower portion 127 of cross head 125 is over the straight portions 132 of track 131 it is not moving but remains stationary with respect to the guide shaft 126. As the drum rotates the actuating portion 133 of the track will move the cross head in one of the directions indicated by double arrows 130. For example, in FIG. 3 with the drum rotating as indicated by arrow 134, when the actuating portion 133 moves the track follower portion 127 of the cross head and the head moves to the right. The chain 123 will also be moved. This causes the sprockets 116 to rotate thus rotating the twisting members 115 and, because of the threading of each pair of the wires 121 through guide bushings 102, cause the wires 121 of each pair to be twisted together.

As the drum continues to rotate the cross head would be moved back to its original position as the opposite segment of actuating portion 133 of track 131 acts on it and the wires are twisted in opposite rotational direction. The cross head moves alternately back and forth along shaft 126 and the wires are thus alternately twisted in opposite directions.

The wires 121 are supplied from a suitable spool or supply of wire (not shown) and are threaded between suitable guide rings 135 that in turn are mounted on a guide tube 136. The wires are looped around the guide tube once, as perhaps best seen in FIG. 6, to create a drag or tension on the wires as they move through the winding head. The guide tube 136 is mounted with respect to the frame of the machine. The guide rings keep the wire from getting tangled and insure a smooth feed of wire through the twisting mechanism. Other conventional ways of creating a drag on the wire can be used if desired, and the drag can be adjustable by using spring loaded clamps.

As stated previously, when the slats are fed into the floor weaving section they are positioned between the tubular guide members 102 of each of the winding or twisting mechanisms 103. This is to insure that the slats will be properly positioned between the pairs of wires coming from each of the twisting mechanisms. It is obvious, of course, that the twisting mechanisms cannot operate with the slats positioned between the guide bushings thereof. Therefore, in order to make sure that the slats will be moved out of guide bushings before the twisting machanism operates a plurality of ejection arms 140 are provided. The ejection arms 140 are fixedly attached to a cross shaft 141 which in turn is rotatably mounted in a pair of bushings 142, 142 that are mounted to a pair of downwardly depending frame members 143 which are fixed to main channel 15. A cam follower arm 144 is fixedly attached to the ejection arms which is aligned with the end portions of control drum 58 opposite from cam ears 59. A cam follower roller 145 is rotatably mounted on the end of the cam follower arm 144 and is positioned to engage a cam 146 that is fixedly attached to the periphery of control drum 58. Two cams 146 are utilized in the control drum, and these are spaced 180 degrees apart, in the same relationship as the two segments of track 131.

As the control drum rotates through most of its cycle the roller 145 rides on the outer periphery of the drum and the arms are retained in position as illustrated by dotted lines at 147 in FIG. 5 under resilient urging of spring 149. In this position the slats are free to enter between the guide bushings 102, 102 in each of the twisting mechaisms. When the cam 146 engages roller 145 the roller will be forced upwardly along the surface of the cam and the upper portions of the arms will be forced forwardly about the axis of shaft 141. This will cause the arms to engage the slat 20 that is positioned between the guide bushings 102 of the twisting mechanisms and will force the slat outwardly from the bushings in direction as indicated by arrow 148 in FIGS. 1 and 5. The cams 146 and the cam ears 59 are timed together with the track 131 so that the machine functions in proper sequence.

As stated previously, there are provided two pairs of guide shafts or pipes 101 for holding the slats in position as they are fed into the machine and these also hold the slats as the pairs of wires are twisted after each slat has been moved out of the guide bushings 102 of the twisting mechanism.

In order to maintain a uniform tension on the floor section as it is being processed and also to keep the slats properly positioned on edge and substantially parallel, the following mechanism is provided. An upper tensioning sprocket set 153 and a lower tensioning sprocket set 154 are utilized. The upper sprocket set 153 is positioned above the floor section and the lower sprocket set 154 is positioned below the floor section as it is made.

The upper tensioning sprocket set includes an upper cross shaft 155 that is rotatably mounted in suitable bearings 156, 156 which in turn are mounted on provided support members 160 fixed to the machine frame. A plurality of upper sprockets wheels 157 (as shown four in number) are spaced evenly along the shaft and drivably mounted thereon.

The lower tensioning sprocket set includes a lower cross shaft 158 which in mounted rotatably on bearings 159, 159 which in turn are bolted to a frame support 160, 160. A plurality of lower sprocket wheels 162 are drivably mounted on lower shaft 158. The lower sprocket wheels 162 are made exactly the same as the upper sprocket wheels 157.

The upper shaft 155 and lower shaft 158 are driven through suitable sprockets 163 and 164, respectively that are drivably mounted on the shafts. A chain 165 is mounted over the lower sprocket 164 and also over an intermediate sprocket 166 that is mounted on a jack shaft 167. The chain 165 engages upper sprocket 163 on a back side of the chain so that the upper tension sprocket wheels 157 and the lower tension sprocket wheels 162 are rotating in opposite rotational direction as shown by the arrows 168 and 169, respectively. (See FIG. 5.)

The jack shaft 167 is mounted on a pair of bearings 173, 173 that in turn are mounted on a suitable support frame 174 which is attached to the main support channel 15. A driven sprocket 175 is also mounted on jack shaft 167 and a chain 176 extends downwardly to engage a drive sprocket 177 that is drivably mounted on main power shaft 43. Thus it can be seen that the motor 46 drives not only the main power shaft 43 and all of the controls associated therewith but also drives the tensioning sprockets.

Referring specifically to FIG. 5 it can be seen that both the upper tensioning sprocket wheels 157 and lower tensioning sprocket wheels 162 are provided with a plurality of cogs 178 around the periphery thereof. The cogs operate to form receptacles 179 each of which is of configuration to receive a portion of one of the slats 20 when it is on edge. The sprockets are timed so that the receptacles are aligned and together hold the slat on edge. As the sprockets are constantly driven whenever the machine is operating the cogs engage the side surfaces of the slat that is positioned between the upper and lower tensioning sprocket sets and exert a pull on the floor section in the direction as indicated by arrow 148 in FIG. 5. The upper and lower tensioning sprocket sets cooperate to keep the slats held on edge as they are traveling through the machine and exert a tension on the wires 121, 121 to overcome the drag created with the loop around shaft 136. The tension on wires 121, 121 may be adjustable by conventional means. The tension on the wire also helps to hold the slat on edge as the wire is twisted. The wire clamps on the edge surfaces of the slat and hold it in place. Both the upper and lower tensioning sprocket sets are driven and thus there is no tendency of the cogs 178 on the wheels to cock the slats in their loops and cause them to move to a horizontal position. The sprockets act on the floor section much like sprockets on a chain as the cogs fit between the slats and drive the slats and wire forwardly. Other types of pulling devices acting on the floor section would cock the slats and cause them to flatten out.

In conventional snow fence making machines, where the slats are woven together in their flat position, it is common practice to use only one sprocket for the tensioning device. However, the use of one sprocket in the present invention is entirely unsatisfactory as the slats will cock and will flatten out in the loops formed by the wire twisters.

*Operation*

When the machine is operating when making poultry floors both the motor 83 and the motor 46 are running. The motor 83 operates only the feed rollers 90 and 104 for driving the slats home into the twisting mechanism. All of the other functions of the machine are operated through the one motor 46 and all are run from the main drive shaft 43. The main shaft 43 and the drum 58 acts as a programer in that it controls the sequence and frequency of operation of all of various functions of the machine and the other functions of the machine are timed through the use of chain and sprockets driving from the main shaft.

The drag chains 22 on the lower side of the slat loading section and the upper drag chain 36 will be rotating under power from chain 36 and sprockets 37 and 38. The slats will be placed on the supports 13, 13 in an upright position so that the edge surfaces 55 and 56 are substantially horizontal and the side surfaces 57 thereof are vertical. The drag chains will hold the slats in this position. It will also keep the slats positioned against the stop member 17.

The operation of twisting the wire around a slat starts when one of the cam ears 59 on drum 58 contacts the cam follower roller 60 and this in turn moves the slider 76 through the provided linkage and levers 61, 67 and 73. This in turn moves the trigger finger 78 of the slider 76 in direction as indicated by arrow 79 and the trigger finger 78 pushes a slat in between drive roller 90 and idler roller 93, which is spring loaded so that the slat is urged against drive roller 90. The slat is then driven by roller 90, which is operated by motor 83 to position between the pairs of guide bushings 102 on the winding heads 103 and also in position between the two pairs of parallel support guide pipes 101. During this time the cross head 125, which is slidably mounted on cross rod 126 is over the straight section 132 of the track 131, which is integral with the outer periphery of the drum 58. Thus the cross head is not moving along the rod 126 during this time and the winding heads are held immobile with the guide bushings 122 thereof in position to receive the slat. The guide bushings are above and below the slat. Also, the slat ejection arms 140 are in position as illustrated in dotted lines at 147 in FIG. 5. This is with the cam follower roller 145 contacting the peripheral surface of the drum.

As soon as the slat 20 is positioned between the guide bushings and against stop member 112, cam 146 on the outer periphery of drum 58 engages cam follower roller 145, which is rotatably mounted on lever 144, and this in turn moves the arms 140 forwardly and pushes the slat that is positioned between the guide bushings 102 in direction as indicated by arrow 148. As soon as the slat clears the guide bushings the arcuate or curved portion 133 of track 131 engages the cross head 125 and the cross head is moved in one of the directions as indicated by double arrow 130, for example to the right in FIG. 3. This in turn causes chain 123 to move and to rotate the sprockets 116 on the twisting members 115. This causes the twisting members to rotate and, due to the fact that the wires 121, 121 of each pair are spaced outwardly from the center of rotation of their respective twisting members through bushings 102, 102 of each of the winding heads, the two wires of each separate pair are twisted together. The winding heads making one 360 degree revolution and put a single twist of wire against the slat that was ejected from the bushings 102 by the arms 140.

All during this time the tensioning sprocket head sets 153 and 154, which consist of four upper and four lower sprocket wheels arranged in vertically aligned pairs and timed so that the cogs and receptacles thereof are aligned when they are adjacent one another, are pulling on the slats in the portions of the floor previously finished and create a tension on the wires 121, 121. The aligned receptacles and cogs of the upper and lower sprocket sets also hold the slats on edge and prevent them from cocking and tipping in the loops formed by the twisted wires. The cogs and receptacles are also axially aligned with respect to the shafts so that each slat is held along its length.

As soon as the two wires of each pair have been twisted by the rotation of the tubular twisting members 115 the second of ears 59 contacts the cam follower 60 and the slat feeding trigger finger 78 is again moved. The finger 78 moves the next slat into the feed mechanism and the slat is positioned between the bushings 102, 102 on each of the winding heads. The previous operation is then repeated with the arms 140 being moved to eject the slat from between the bushings by a second of the cams 146. Once the slat has been ejected from between the bushings 102 the cross head 125 is acted upon by the second actuator section 133 of track 131 and the cross head will move in opposite direction from that which it moved before and the wires will be twisted in an opposite direction one full turn. The cross head moves back and forth to twist the wires. The cycle will then repeat itself as before.

The finished portions of the floor moving in direction 148 are supported by the two pairs of support pipes 101 for a distance after they leave the upper and lower tensioning sprocket sets. The floor sections are sufficiently rigid to support themselves when they leave the support pipes and, as they are normally made in four foot lengths, will be permitted to extend to that length and then will be trimmed off from the slat sections remaining in the machine.

It can be easily seen that through the use of a central programing drum to control and time all of the various functions of the machine, namely starting the slats into the feed mechanism, actuating the slat ejector arms 140 and controlling and running the winding heads 103, the chance of any interference between parts during the operations is virtually eliminated. In other words the slats will always clear the bushings 102 before the winding heads are rotated. If a slat remained between the bushings on any of the winding heads as the winding head was rotated it would of course damage the mechanism.

The tensioning sprocket sets and the drag chains are constantly running and are operated by the main shaft 43 that operates the programing drum. Thus whenever the programing drum is working the tensioning sprockets will keep the wire under tension and will act to move the finished portions of the floor sections away from the winding heads.

The machine as disclosed in the present invention shows a way of manufacturing poultry floor made of slats placed on edge. Previously it has been impossible to hold slats on edge during the wire twisting operation because the slats tend to cock or flatten out when the winding heads rotate. However, through the use of two tensioning sprocket sets the slats are positively held on edge while the wire is twisted thus making an economical and highly satisfactory poultry floor.

Through the use of a central programing drum it has been found that the machine made according to the present invention can be operated at the rate of 70 to 75 slats per minute without fear of jamming or damage to the machine. The operation is continuous and thus the floors are produced economically and are stronger and more versatile than conventional poultry floors. In addition the cost of manufacturing is sharply reduced through the use of the automatic mechanism described.

What is claimed is:

1. A machine for making a support structure from a plurality of slats joined together by wires wherein the slats used have a pair of relatively narrow substantially parallel edge surfaces and a pair of substantially parallel wider side surfaces joining said edge surfaces, said machine including a main frame, guide means on said frame, at least one pair of spaced apart aligned wires mounted for longitudinal movement with respect to said guide means, means for positioning one of said slats at a time on edge transverse to and between said aligned wires, means for twisting said wires together to form a loop around said slat, and power means for moving said slat and said wires in the longitudinal direction of said wires and simultaneously holding said slat on edge including a pair of shafts rotatably mounted with respect to said main frame on opposite sides of the plane of said support structure, a plurality of sprocket wheels drivably mounted on each of said shafts and being arranged in aligned pairs, said sprocket wheels having cogs around the periphery thereof defining receptacles, the receptacles of said sprockets of each of said aligned pairs cooperating to hold opposite edge portions of the same slat simultaneously and of subsequent slats in sequence, power drive means connected to said shafts to rotate said shafts and sprockets in opposite rotational direction, and support means slidably supporting said slats for movement between said wire twisting means and said sprockets.

2. A machine for making a support structure from a plurality of slats joined together by wires wherein the slats used have a pair of relatively narrow substantially parallel edge surfaces and a pair of substantially parallel wider side surfaces joining said edge surfaces, said machine including a main frame, a slat loading section on said main frame at least one pair of spaced apart aligned wires, slidably mounted with respect to said main frame, means for feeding one of said slats at a time on edge transverse to and between said aligned wires, means on said frame for twisting said wires together to form a loop around said slat, means for moving said slat and said wires in the longitudinal direction of said wires and simultaneously holding said slat on edge including a pair of aligned, rotatably sprockets, each having receptacles defined in the outer periphery thereof to receive and retain opposite edge portions of said slat after said wire has been twisted around said slat, trigger means for moving said slat into said means for feeding said slat between said wires, and a powered central programming device on said frame for operating the functions of said trigger means, said means for twisting said wire, and said means for moving said slat and wire, including power transmission means connected between said central programming device and said sprockets to rotate said sprockets in opposite rotational directions to tend to move said slat and said wire in direction away from said means for twisting said wires.

3. A machine for making poultry floor sections comprised of a plurality of spaced parallel slats joined together by pairs of wires twisted together between adjacent slats, each of said slats having a pair of substantially parallel spaced apart edge surfaces and a pair of wider side surfaces joining said edge surfaces, said slats being arranged in said floor sections so that one of the side surfaces of each of said slats faces a side surface of the next adjacent slats, said machine including a main frame, a slat supporting member on said main frame, a plurality of winding heads, mounted on said main frame, a pair of wires slidably mounted in spaced apart relationship on each of said winding heads, said wires being aligned and spaced apart sufficient to permit a slat to be positioned transversely to said wires and between each pair of wires on said machine, drag means for resisting movement of said wires, power means for feeding said slats one at a time from said support member to position between each pair of wires, trigger means for moving one of said slats at a time from said slat support member into engagement with said power feed means, means for holding said slats on edge and for moving said slats transversely forwardly away from said winding heads and said wires longitudinally through said winding heads in a continuous motion against the action of said drag means including a pair of substantially parallel feed shafts rotatably mounted with respect to said main frame, one positioned on each side of a plane coincident with the top of said poultry floor section, a plurality of sprockets drivably mounted on each of said feed shafts, said sprockets on opposite feed shafts being arranged in aligned pairs, each of said sprockets having a plurality of cogs around the periphery thereof defining receptacles for receiving a portion of a slat, said sprockets being timed to cooperate to receive and hold opposite edge portions of the same slat and move said slat forwardly, power means for operating said winding heads to twist each separate pair of wires together, a central power driven programming device for powering and controlling said means for holding said slats on edge and moving said slats forwardly, for actuating said trigger means at predetermined intervals and for operating said winding heads to twist said wires together whenever said trigger means has caused a slat to be fed into said power feed means and thence between said pairs of wires, and drive means connected between said feed shafts and said central programming device for continuously driving said feed shafts in opposite rotational direction whenever said programming device is powered.

4. The combination as specified in claim 3 wherein said winding heads are comprised as outer housings fixedly attached with respect to said main frame, and an inner housing rotatably mounted with respect to said outer housing, each of said inner housings having means thereon for holding its associated pair of wires in spaced relationship and aligned with the pairs of wires of the other winding heads, and wherein said inner tubular members are twisted one complete revolution alternately in opposite rotational directions after a different slat has been positioned between the wires of each pair.

5. The combination as specified in claim 4 wherein said means for rotating each of said inner members of said winding heads is comprised as a sprocket mounted on a rear portion of each of said inner members, a continuous chain drivably associated with each of said sprockets, and means connected between said central programming device and said chain for moving said chain alternately in opposite directions whenever a different slat is positioned between said individual pairs of parallel wires.

6. The combination as specified in claim 3 wherein said central programming device includes a main power shaft rotatably mounted with respect to said main frame, motor means drivably connected to said main power shaft, a programing drum drivably mounted on said main power shaft, cam means on said drum for actuating said trigger mechanism at a predetermined frequency as said programing drum rotates, a cross head shaft fixedly attached with respect to said main frame adjacent said programing drum and substantially parallel to the axis of said drum, a cross head slidably mounted on said cross head shaft, a cam track fixedly attached to the outer periphery of said programing drum, said cross head being drivably associated with said cam track so that as said drum rotates said cross head moves alternately back and forth along said cross head shaft, and means connected between said cross head and said winding heads for causing said winding heads to rotate whenever said cross head moves longitudinally along said shaft.

7. A machine for making poultry floor sections comprised of a plurality of spaced slats joined together by pairs of wires twisted together between adjacent slats, each of said slats having a pair of substantially parallel spaced apart edge surfaces and a pair of wider side surfaces joining said edge surfaces, said slats being arranged in said floor section so that one of the side surfaces of each of said slats faces a side surface of the next adjacent slats, said machine including a main frame, a slat supporting member on said main frame, a plurality of winding heads mounted on said main frame, each of said winding heads comprising a tubular outer member fixed with respect to said main frame and a tubular inner member rotatably mounted with respect to said outer member, said tubular inner members each having a portion extending forwardly from its respective outer member and being provided with a pair of openings through the wall portion of said forwardly extending portion, a separate pair of tubular wire guides fixedly attached to each of said tubular inner members of said winding heads diametrically opposite from each other, said guides being aligned with and positioned forwardly from the openings in said forwardly extending portions of said tubular inner members, power drive means for feeding said slats, one at a time from said support member to position between each pair of guide bushings of each of said winding heads and extending transverse to the axis of said tubular member, a separate pair of continuous wires threaded through each of said tubular inner members and each wire of each pair extending through one of said openings in said forwardly extending portion and through the corresponding tubular guide for each of said winding heads, drag means for resisting movement of said wires, trigger means for moving one of said slats at a time from said slat support member into said power feed means, ejection means for moving a slat positioned between the separate pairs of guide bushings forwardly and clear of said guide bushings, means for holding said slats on edge and moving said slats transversely forwardly and said wire longitudinally through said winding heads against the action of said drag means as said wires are twisted, and a central programming device including a main power shaft rotatably mounted with respect to said main frame, motor means drivably connected to said main power shaft, a programming drum drivably mounted on said main power shaft, first cam means on said drum for actuating said trigger mechanism at a predetermined frequency as said programming drum rotates, second cam means on said programming drum for actuating said ejection mechanism at a predetermined frequency and in a definite relationship to said first cam means as said programming drum rotates, a cross head shaft fixedly attached with respect to said main frame adjacent said programming drum and substantially parallel to the axis of said drum, a cross head slidably mounted on said cross head shaft, a cam track fixedly attached to the outer periphery of said programming drum, said cross head being drivably associated with said cam track so that as said drum rotates said cross head moves alternately back and forth along said cross head shaft, means connected between said cross head and the inner tubular members of said winding heads for causing said inner tubular members of said winding heads to rotate whenever said cross head moves longitudinally along said shaft, and drive means connected between said programming device and said means for holding said slats on edge and moving said slats transversely forwardly and said wires longitudinally through said winding heads.

8. The combination as specified in claim 7 wherein said means connected between said cross head and said winding heads includes a separate sprocket drivably mounted with respect to each of said tubular inner members of said winding heads, a continuous chain drivably mounted on said sprockets, and a link extending between said cross head and said chain, said chain being mounted so that as said cross head moves longitudinally along said cross head shaft said tubular inner members rotate in identical rotational directions.

9. The combination as specified in claim 8 wherein said power drive means for feeding said slats to position between said guide bushings includes a continuously driven friction roller positioned to engage a side surface of said slat, and an idler roller resiliently urged toward said continuously driven friction roller, said trigger means being operable to insert said slats between said idler roller and said friction roller, said idler roller being operable to hold said slat in engagement with said friction roller until said slat is in position between said tubular guide members.

10. The combination as specified in claim 9 wherein said ejector means includes a shaft rotatably mounted on said main frame below said slats, a plurality of arms fixedly attached to said shaft and extending upwardly, said arm being movable between a first normal position and a second slat ejecting position, bias means to urge said arm toward said first position, a cam follower fixedly attached to one of said arms and positioned to be contacted by said second cam means on said programming drum, said arms thereby being moved to said second position at predetermined intervals.

References Cited in the file of this patent
UNITED STATES PATENTS

| | | |
|---|---|---|
| 401,298 | Parker et al | Apr. 9, 1889 |
| 649,598 | De Chenne | May 15, 1900 |
| 1,126,285 | Robinson | Jan. 26, 1915 |